United States Patent [19]

Berg

[11] 4,189,923
[45] * Feb. 26, 1980

[54] GEOTHERMAL ENERGY RECOVERY

[76] Inventor: Clyde Berg, 3655 E. Ocean Blvd., Ste. 2-H, Long Beach, Calif. 90803

[*] Notice: The portion of the term of this patent subsequent to Nov. 22, 1994, has been disclaimed.

[21] Appl. No.: 889,038

[22] Filed: Mar. 22, 1978

[51] Int. Cl.² .............................................. F03G 7/00
[52] U.S. Cl. ..................................... 60/641; 166/314
[58] Field of Search ............. 60/641; 166/314, 244 C, 166/265; 165/45

[56] References Cited

U.S. PATENT DOCUMENTS

| | | | |
|---|---|---|---|
| 4,026,111 | 5/1977 | Matthews | 60/641 |
| 4,059,156 | 11/1977 | Berg | 166/314 |
| 4,060,988 | 12/1977 | Arnold | 60/641 |
| 4,063,417 | 12/1977 | Shields | 60/641 |

*Primary Examiner*—Allen M. Ostrager
*Attorney, Agent, or Firm*—Fulwider, Patton, Rieber, Lee & Utecht

[57] ABSTRACT

There is disclosed a method for recovering energy from subterranean geothermal brines and increasing geothermal well production. The method comprises establishing a column of brine in a well casing having a tubing therein, open at its lower end to the column of brine and injecting a high pressure vapor such as nitrogen or steam into the bottom of the tubing in sufficient quantities to form a mixture of brine and vapor having a substantially lesser density than the surrounding column of brine whereby the hydrostatic head of the column of brine lifts the mixture to the surface. The mixture is withdrawn from the well and passed to a vapor-liquid separator where the vapor portion is separated without effecting any significant reduction in pressure of the produced mixture, whereby the pressure is maintained on the brine in the well at a sufficient value to prevent carbonate and scale formation. In the preferred embodiment, the separated vapor is divided into two portions, one portion goes to production and is used to produce energy or as a high temperature heat source. The other portion is repressured and injected into the well as the source of high pressure vapor used therein. The brine separated from the vapor is depressured and the evolved vapor is expanded to produce useful work in a plurality of states. In a preferred embodiment using steam, the vapor is separated by contact of the vapor with brine from a succeeding brine depressurization step, condensing that portion of the vapor intended for subsequent power generation.

11 Claims, 3 Drawing Figures

GEOTHERMAL ENERGY RECOVERY

BACKGROUND OF THE INVENTION

1. Field of the Invention

This invention relates to a method of power generation, and, in particular, to a method of geothermal power generation.

2. Brief Statement of the Prior Art

The successful geothermal power projects to date have exploited subterranean steam reservoirs. The more common subterranean brine reservoirs have not been developed, primarily because of the difficulties experienced in producing hot geothermal brine. The brine is difficult to produce because it forms scale deposits, chiefly calcium carbonate, when it is depressured. Attempts to avoid the scaling have included the use of down hole heat exchangers, however, the corrosive nature of the brine makes this approach impractical.

In my prior patent, U.S. Pat. No. 4,059,156, I disclose and claim a method for producing brine by injecting, into a column of brine, a low density lift medium which is sufficient to reduce the density of the resulting mixture, permitting it to be produced by the hydrostatic head of the brine column without any significant depressuring of the brine. Thereafter, the brine can be depressured above surface in equipment adapted for handling of slurries and scaling liquids.

While the method described and claimed in my aforesaid patent is a substantial improvement in geothermal brine production, improvements are desirable in increasing the thermal efficiency of the process by providing increased recovery of energy from the produced brine.

BRIEF STATEMENT OF THE INVENTION

This invention provides a method for geothermal brine production and energy recovery which is highly efficient. The method comprises an improvement of my prior patented brine production method in that high pressure vapor such as nitrogen or steam is employed as the lift medium to reduce the density of a mixture of vapor and brine, permitting its production without encountering any significant scale formation in the production tubing. The invention can be applied to maximum efficiency energy production to produce high pressure steam to drive turbines and the like or to maximum heat production where the brine is depressured during production to a value at or slightly above that causing incipient scale formation. The produced brine and vapor mixture is passed to suitable vapor-liquid separation where the vapor is removed. The separated vapor is divided into two portions; one portion is utilized for generation of useful power or as a heating medium and the other portion is prepressured for injection into the well as the source of high pressure steam used as the lift medium therein. In a preferred embodiment, the vapor is divided into the recycle and power generation portions by direct contact of the separated vapor with brine from a succeeding depressuring and vapor separating step with the amount of brine contacting the vapor being sufficient to condense the portion of the vapor to be used for power generation and the uncondensed portion being compressed for injection into the well tubing.

BRIEF DESCRIPTION OF THE DRAWINGS

The invention will be described with reference to the drawings of which.

DESCRIPTION OF THE PREFERRED EMBODIMENTS

Figure 1:
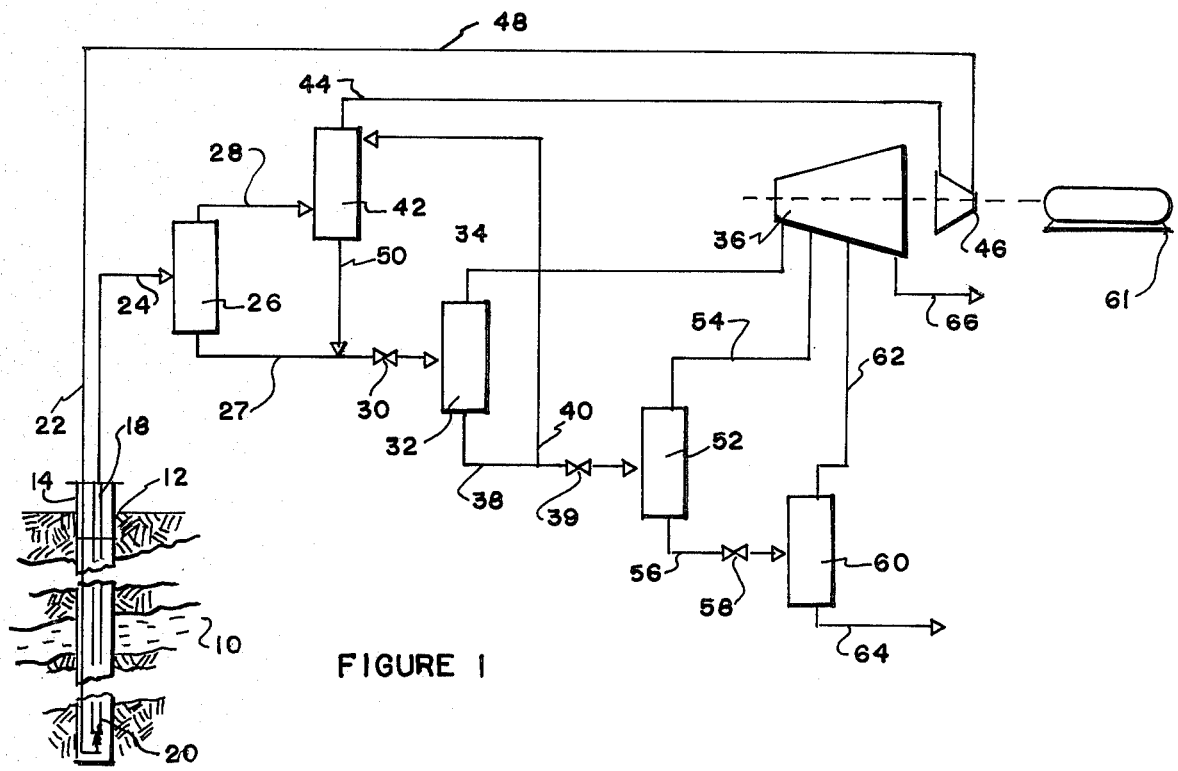
FIG. 1 is a flow schematic of one embodiment of the invention.

Referring to FIG. 1, the invention is applied to the production of brine from a subterranean interval 10 which is pierced by a well 12. The casing 14 of well 12 is perforated at the brine interval 10 and fills substantially with a column 16 of the brine. A production tubing 18 is placed in the well casing 14 and this tubing is in open communication at its lower most end 20 with the column of brine 16. A second tubing 22 is placed in the casing 14 and discharges into the lower end 20 of the first tubing 18. The embodiment of FIG. 1 can be used with steam or with a non-condensible gas such as nitrogen, as the high pressure vapor since this embodiment can be practiced without any bleed of the vapor from the system. Since steam, however, is a preferred high pressure vapor, the remainder of the description of FIG. 1, as with the description of FIGS. 2 and 3, will be directed to the use of steam.

Steam is injected into the first production tubing 18 from tubing 22 in an amount sufficient to reduce the density of the brine by forming a mixture of brine and steam having a concentration of steam from about 1 to about 4 vapor to liquid ratio. The reduction in density is sufficient to permit the surrounding column of brine 16 to lift the mixture to the surface from where it is produced, being withdrawn through line 24. The mixture is passed to separation drum 26 which is maintained at substantially the pressure of tubing 18, whereby the brine is maintained at sufficient pressure that it does not deposit scale or carbonate precipitates. The brine and steam mixture is separated in vessel 26 and the separated brine is withdrawn through line 27 with the steam being withdrawn through line 28.

Figure 2:
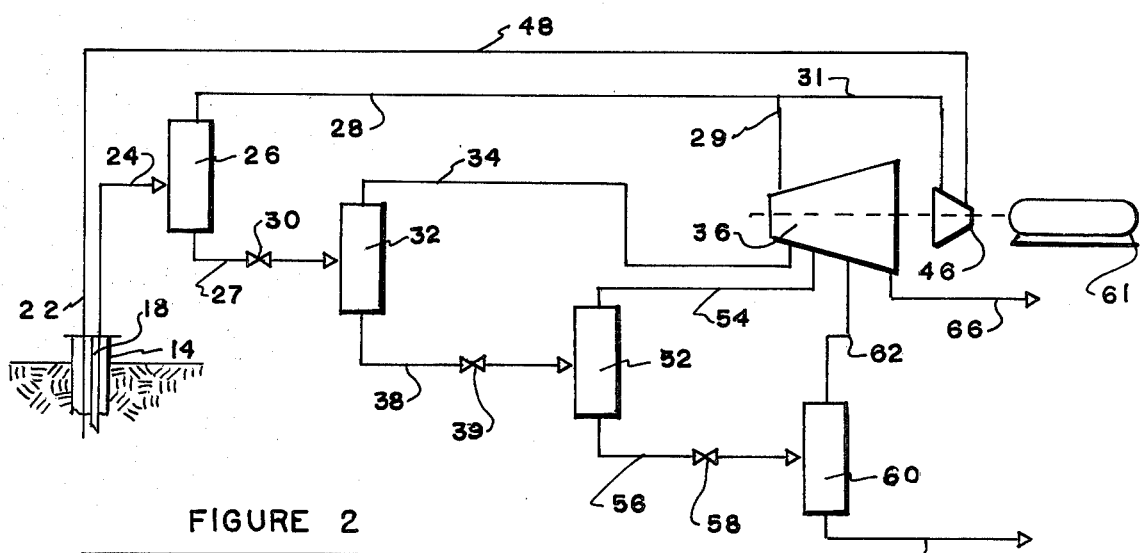
FIG. 2 is a flow schematic of a second embodiment of the invention.

In the application for maximum efficiency energy production, as shown in FIGS. 1 and 2, the mixture of steam and brine is produced at maximum pressure so that the steam released in vessel 26, and succeeding flash vessels, is at a high pressure to permit efficient use of steam turbines and the like for power generation.

The brine from line 27 is depressured through valve 30 and flashed in flash drum 32. A vapor stream is withdrawn from this flash drum 32 through line 34 and passed to power generation, typically a turbine 36.

Brine is withdrawn from vessel 32 through line 38 and is divided into two portions; one portion is passed through line 40 to a vapor scrubbing vessel 42 where it is passed in countercurrent, direct contact with the separated steam from vessel 26. A sufficient quantity of brine is recycled through line 40 through line 28. The uncondensed vapor from vessel 42 is removed through line 44 and passed to compressor 46 which repressures the steam to the pressure of the subterranean interval and the repressured steam is passed through line 48 to the production tubing 22 for injection into the well.

The liquid brine and the condensed portion of the vapor separated in vessel 42 is passed through line 50 and introduced also into vessel 32 through pressure reduction valve 30.

The brine from vessel 32 is passed through line 38 and depressured through valve 39 into flash vessel 52. The vapors evolved from flash drum 52 are removed through line 54 and passed an intermediate stage of the power turbine 37. The brine from flash drum 52 is removed through line 56, depressured in with valve 58 and introduced into flash drum 60. The vapors evolved from the pressure reduction of the brine are passed to the final stages of the turbine 36 and the combined and condensed vapor streams are removed through line 66. Turbine 36 can be mechanically coupled to a work output or to an electrical power generator such as 61. The brine from flash drum 60 is removed through line 64 and can be used for subsequent treatment facilities, e.g., heating and the like to produce a brine stream which can be passed to settling ponds for solar evaporation or which can be returned to a subterranean formation through a suitable injection well. During its successive depressuring steps, the brine forms precipitates, chiefly calcium carbonate, which can be handled in the above-ground equipment and the brine stream discharged from the system will typically be a brine slurry of salts.

Referring now to FIG. 2, another embodiment of the invention will be described. The embodiment of FIG. 2 has similar subterranean production tubings 18 and 22 and well casing 14 as in FIG. 1 The combined mixture of steam and brine is removed through line 24 and passed without pressure reduction to separation drum 26. A vapor stream is removed through line 28 and this vapor portion is divided into two streams. Stream 29 is introduced at the initial stages of work generating turbine 36, or alternatively this stream may be used in heat exchange as a heating medium. Stream 31 is passed to the compressor 46 where the stream is compressed to the subterranean formation pressure for recycling through line 48 and injection, through production tubing 22 into the formation well casing in the manner described with reference to FIG. 1.

The brine separated from the produced mixture is passed through line 27 and depressured through valve 30 into flash drum 32. The reduced pressure permits separation of a vapor which is removed through line 34 and introduced at an intermediate stage in the turbine 36. The brine is removed through line 38, depressured by valve 39 and introduced into flash drum 52. The brine in flash drum 52 separates into vapor which is passed through line 54 to an intermediate stage of turbine 36 and a liquid brine which is removed through line 56. The brine is depressured in valve 58 and introduced into the last flash drum 60 of the series where it separates into vapor that is passed through line 62 to the final stage of turbine 36. The condensate from turbine 36 is removed through line 66. The brine separated from the flash drum 60 is removed through line 64 for further residual heat recovery and/or solar evaporation or injection into the formation.

Figure 3:
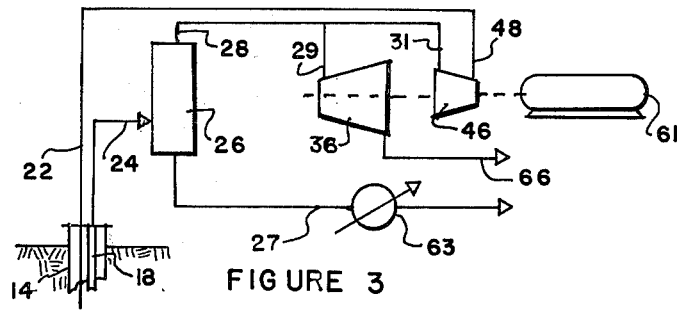
FIG. 3 is a flow schematic of a third embodiment of the invention, useful for maximum geothermal brine production.

Referring to FIG. 3, a third embodiment of the invention will be described. This is for the case where a maximum production of both steam and brine is desired to achieve the maximum heat (B.T.U.) production from the well. In this case, the pressure at the top of the well separation drum 26 is maintained at an intermediate pressure compatible with the prevention of scale deposition in the well casing. This pressure should be sufficient that certain gases, principally carbon dioxide, are not released in such amounts as to cause the formation of scale. The amount of permissible pressure reduction can be determined for any brine by sampling the brine under the reservoir pressure and incrementally depressuring the sample and observing when scale tends to form.

The embodiment of FIG. 3 has similar subterranean production tubing 18 and 22 and well casing 14 as in FIG. 1. The combined mixture of steam and brine is removed through line 24 and passed without further pressure reduction to separation drum 26. A vapor stream is removed through line 28 and this vapor portion is divided into two streams; stream 29 goes to production for use as a heating medium or energy source, and stream 31 is passed to the compressor 46 where the stream is compressed to the subterranean formation pressure for recycling through line 48 and injection, through production tubing 22 into the formation well casing in the manner described with reference to FIG. 1. The brine separated from the produced mixture is passed through line 27 and is not further depressured in this case, but passes directly to heat recovery means such as heat exchanger 63 for further heat recovery and injection into the formation.

The invention will be described with reference to a specific embodiment of FIG. 1 by the following example.

EXAMPLE 1

This example is directed to the recovery of energy from geothermal brine at a depth of 4000 feet, a temperature of 600° F. and a pressure of 1544 psia. The brine is produced at a rate of one million pounds per hour of mixed brine and steam by the injection of high pressure steam at the rate of 16 cubic feet per second at the formation pressure of 1544 psia through tubing 22.

The produced mixture is passed to separation vessel 24 which is maintained at a pressure of 1045 psia, sufficient to prevent the formation of calcium carbonate precipitates. At this pressure, the mixture separates to produce 33 cubic feet per second of high pressure steam which is passed through line 28 to vessel 42 and 722,000 pounds/hour of brine which is removed through line 26 and passed to vessel 32.

The brine is depressured through valve 30 to 423 psia and a temperature of 450° F., producing a flow of 62 cubic feet per second of high pressure steam which is passed to turbine 36. The brine which is separated in vessel 32 is divided into two portions; a flow of 408,000 pounds/hour is passed through line 40 for direct contact with the vapor released in separation vessel 42. This quantity of brine is sufficient to condense approximately 27 percent of the steam in the produced mixture and the vapor passed through line 44 to compressor 46 constitutes 24 cubic feet per second which is repressured from 1045 psia to the subterranean pressure of 1544 psia, thus supplying the total steam requirements for the lift medium used in the process.

The quantity of brine depressured through valve 38 and passed to vessel 52 is 696,000 pounds/hour. The brine is reduced in pressure to 103 psia and a temperture of 330° F., producing steam at a rate of 114 cubic feet persecond, which is passed through line 54 to the intermediate state of turbine 36. Brine is removed from vessel 52 at a rate of 594,000 pounds/hour and is depressured through valve 58 to 40 psia and 270° F., producing 109 cubic feet per second of steam which is passed through line 62 to the turbine 36 and 485,000 pounds/hour of brine which is removed through line 64.

The process as thus described is highly efficient. The brine produced from the well is processed by the invention to recover approximately eighty percent of the recoverable energy, defined as the energy in excess of that contained in the brine at the atmospheric boiling point of 220° F. Additionally, the brine is produced without encountering any significant scaling or precipitate formation within the well casing 12 since the pressure on the production tubing is maintained above about 1000 psia, thereby inhibiting the release of carbon dioxide and the formation of calcium carbonates.

Maintaining the pressure on the produced mixture of steam and brine until after the initial separation of vapor also provides the advantage of permitting separation of a vapor stream which is chiefly steam with little or no release of the non-condensible gases such as carbon dioxide, hydrogen sulfide and the like. This permits the direct recycling of the repressured steam through the production tubing without requiring an intermediate treatment to remove the non-condensible gases which could otherwise steadily increase in concentration in the recycle stream.

The invention has been described with reference to the presently preferred embodiment and a specific example has been illustrated to demonstrate the results obtainable thereby. It is not intended that the invention be unduly limited by this description of the presently preferred embodiment. Instead, it is intended that the invention be defined by the process steps, and their obvious equivalents, set forth in the following claims.

What is claimed is:

1. A method for recovery of energy and production of useful work from a high temperature geothermal brine in a well substantially filled with said brine with a casing having a production tubing in communciation therewith at its lower end and which comprises:
    (a) introducing a vapor under high pressure into said casing and passing said vapor as a confined stream to a subterranean depth in said casing;
    (b) injecting said vapor into said production tubing to admix with said brine therein and to form an intimate mixture with said brine having a density sufficiently less than the density of said brine whereby said brine in said casing surrounding said production tubing exerts a hydrostatic head on said mixture to lift said mixture to the surface through said tubing;
    (c) discharging said mixture from said tubing into a vessel and separating said mixture into vapor and brine while maintaining the mixture under superatmospheric pressure sufficient to prevent the release of gases from said brine and the concomittant deposit of calcium carbonate scale in said tubing;
    (d) expanding said separated vapor to generate work therefrom; and
    (e) forming high pressure vapor for introduction into said casing in step (a).

2. The method of claim 1 including the step of separating said vapor obtained in step (c) into two portions and using work developed by expansion of a first portion of said vapor to compress a second portion thereof as the source of said high pressure vapor.

3. The method of claim 2 wherein said vapor is steam.

4. The method of claim 1 wherein said brine separated in step (c) is depressured and vapor evolved therefrom is expanded to generate work.

5. The method of claim 4 wherein said brine separated in step (c) is depressured in several stages.

6. The method of claim 4 wherein said vapor separated in step (c) and evolved by depressuring said brine are expanded in a common turbine.

7. The method of claim 1 wherein the brine separated in step (c) is depressured and the evolved vapor separated from the brine and a portion of the brine is repressured and passed in direct contact with the vapor separated in step (c).

8. The method of claim 7 wherein the said portion of said brine passed in direct contact with said vapor is sufficient to condense a predetermined portion of said vapor.

9. The method claim 8 wherein the uncondensed vapor from said direct contact with said portion of said brine is repressured and recycled as the source of vapor introduced into said well casing in step (c).

10. The method of claim 9 wherein said vapor is steam.

11. The method of claim 1 wherein said mixture is depressured to or slightly above a predetermined value which corresponds to that at which incipient scale formation occurs in said brine.

* * * * *